(12) United States Patent
Lang

(10) Patent No.: US 12,085,164 B2
(45) Date of Patent: Sep. 10, 2024

(54) METHOD FOR CONTROLLING GEAR CHANGES IN A TRANSMISSION OF A MOTOR VEHICLE DRIVETRAIN

(71) Applicant: ZF Friedrichshafen AG, Friedrichshafen (DE)

(72) Inventor: Ulf Lang, Aidlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/041,427

(22) PCT Filed: Jul. 29, 2021

(86) PCT No.: PCT/EP2021/071292
§ 371 (c)(1),
(2) Date: Feb. 13, 2023

(87) PCT Pub. No.: WO2022/033888
PCT Pub. Date: Feb. 17, 2022

(65) Prior Publication Data
US 2023/0296170 A1   Sep. 21, 2023

(30) Foreign Application Priority Data
Aug. 14, 2020   (DE) .................... 10 2020 210 358.5

(51) Int. Cl.
*F16H 61/02*   (2006.01)
*B60W 10/11*   (2012.01)
(Continued)

(52) U.S. Cl.
CPC ......... *F16H 61/0213* (2013.01); *B60W 10/11* (2013.01); *B60W 10/184* (2013.01);
(Continued)

(58) Field of Classification Search
CPC ...... F16H 59/54; F16H 61/0213; F16H 61/16; F16H 2061/0234; F16H 2061/0237;
(Continued)

(56) References Cited

U.S. PATENT DOCUMENTS 5,022,286 A * 6/1991 Takizawa ................ F16H 61/21
477/94
5,281,190 A   1/1994 Koivunen
(Continued)

FOREIGN PATENT DOCUMENTS

DE   44 46 111 A1   7/1995
DE   101 42 274 A1   3/2003
(Continued)

OTHER PUBLICATIONS

European Patent Office, International Search Report issued in International patent application PCT/EP2021/071292 (Oct. 18, 2021).
(Continued)

*Primary Examiner* — Edwin A Young
(74) *Attorney, Agent, or Firm* — Finch & Maloney PLLC

(57) ABSTRACT

A method is disclosed for controlling gearshifts in a transmission of a motor vehicle. Devising a shifting strategy of the gearshift takes into account the operation of a sustained-action braking device (10). To organize gearshifts in an optimum way having regard to the operation of the sustained-action braking device (10), at the beginning of the operation of the sustained-action braking device (10) it is examined with what starting criterion the operation of the sustained-action braking device (10) was initiated. Depending on the starting criterion identified, a current workload of the sustained-action braking device (10) is compared against an associated threshold value. Alternately, a gearshift is carried out directly to a lowest possible gear of the motor vehicle transmission (4). If the comparison of the current
(Continued)

workload of the sustained-action braking device (10) exceeds the threshold value, then the shifting strategy is adapted.

20 Claims, 2 Drawing Sheets

(51) Int. Cl.
*B60W 10/184* (2012.01)
*B60W 10/196* (2012.01)
*B60W 30/14* (2006.01)
*B60W 30/18* (2012.01)
*F16H 59/54* (2006.01)
*F16H 61/16* (2006.01)

(52) U.S. Cl.
CPC ........ *B60W 10/196* (2013.01); *B60W 30/146* (2013.01); *B60W 30/18136* (2013.01); *F16H 59/54* (2013.01); *F16H 61/16* (2013.01); *B60W 2510/18* (2013.01); *B60W 2710/1005* (2013.01); *B60W 2710/18* (2013.01); *F16H 2061/0234* (2013.01); *F16H 2061/0237* (2013.01)

(58) Field of Classification Search
CPC .. B60W 10/11; B60W 10/184; B60W 10/196; B60W 30/146; B60W 30/18136; B60W 2510/18; B60W 2710/1005; B60W 2710/18
See application file for complete search history.

(56) References Cited

U.S. PATENT DOCUMENTS

| | | |
|---|---|---|
| 5,655,990 A | 8/1997 | Ooyama et al. |
| 5,928,107 A | 7/1999 | Bieber |
| 7,469,178 B2 | 12/2008 | Shiiba et al. |
| 8,229,634 B2 | 7/2012 | Winkel |
| 9,085,293 B2 | 7/2015 | Maier et al. |
| 2007/0060443 A1* | 3/2007 | Kageyama ............ F16H 61/143 |
| | | 477/64 |
| 2010/0324793 A1 | 12/2010 | Winkel |
| 2011/0153173 A1 | 6/2011 | Wolfgang et al. |
| 2013/0139632 A1* | 6/2013 | Rake ........................ F16H 59/08 |
| | | 74/473.3 |
| 2018/0299008 A1* | 10/2018 | Wippler .................. F16H 59/60 |
| 2020/0141486 A1 | 5/2020 | Hawley et al. |

FOREIGN PATENT DOCUMENTS

| | | |
|---|---|---|
| DE | 102 42 567 A1 | 3/2004 |
| DE | 10 2006 001 818 A1 | 7/2007 |
| DE | 10 2008 023 135 A1 | 11/2009 |
| EP | 1 750 038 A2 | 2/2007 |
| WO | 2006/119937 A1 | 11/2006 |
| WO | 2007/045332 A1 | 4/2007 |

OTHER PUBLICATIONS

European Patent Office, Written Opinion issued in International patent application PCT/EP2021/071292 (Oct. 18, 2021).

* cited by examiner

METHOD FOR CONTROLLING GEAR CHANGES IN A TRANSMISSION OF A MOTOR VEHICLE DRIVETRAIN

RELATED APPLICATIONS

This application claims the benefit under 35 U.S.C. § 371 as a U.S. National Phase Application of application no. PCT/EP2021/071292, filed on 29 Jul. 2021, which claims benefit of German Patent Application no. 10 2020 210 358.5 filed 14 Aug. 2020, the contents of which are hereby incorporated herein by reference in their entireties.

FIELD OF THE DISCLOSURE

The invention relates to a method for controlling gearshifts in a transmission of a motor vehicle drivetrain, wherein when devising a shifting strategy for the gearshift the operation of a sustained-action braking device of the motor vehicle drivetrain is taken into account. Furthermore, the invention relates to a control unit, a computer program product and a data carrier.

BACKGROUND

In automated manual transmissions and in automatic transmissions, gearshifts are carried out automatically in such manner that the control of the gearshift concerned takes place in accordance with a selected shifting strategy in each case. In some cases, when devising the shifting strategy concerned the operation of a sustained-action braking device of the motor vehicle is also taken into account so that while the sustained-action braking device is in operation, a gear suitable for that will be engaged in the transmission.

DE 102 42 567 A1 discloses a method for controlling gearshifts in a transmission of a motor vehicle drivetrain, wherein a shifting process should be designed to suit the driving situation optimally, for which purpose various parameters are taken into account. Among other things, for this purpose it is proposed to take the operation of a sustained-action braking device into account.

SUMMARY

Starting from the above-described prior art it is the purpose of the present invention to control gearshifts in a transmission of a motor vehicle drivetrain during the operation of a sustained-action braking device, in such manner that an involvement of the sustained-action braking device, which is optimum for the braking operation, is obtained.

From the method-technological standpoint, this objective is achieved with a method for controlling gearshifts in a transmission of a motor vehicle drivetrain, in accordance with the present disclosure. The present disclosure provides advantageous further developments of the invention. Furthermore, the present disclosure is directed to a control unit with which a method according to the invention can be carried out. In addition, the present disclosure relates to a computer program product and to a data carrier having a computer program product as described.

According to the invention, in a method for controlling gearshifts in a transmission of a motor vehicle drivetrain, to devise a shifting strategy of the gearshift, the operation of a sustained-action braking device of the motor vehicle drivetrain is taken into account. Thus, the method according to the invention is used so that to devise a shifting strategy in accordance with which gearshifts are to be carried out in a motor vehicle transmission, the actual operation of a sustained-action braking device is permitted at the time.

In the context of the invention, a "sustained-action braking device" is a wear-free retarder which is positioned on the drive input side of the transmission, so that the selection of a gear in the transmission, and thus its gear ratio, has an influence on the braking action, effectively brought about at drive wheels of the motor vehicle by the sustained-action braking device. This is because with a sustained-action braking device arranged on the drive input side of a transmission, a braking torque produced by the braking device is transmitted, in accordance with the gear currently selected in the transmission, to the drive output side of the transmission and thus to the drive output wheels. In the context of the invention the sustained-action braking device can be a retarder positioned between the drive machine and the transmission, which can specifically be in the form of a hydrodynamic retarder or an electrodynamic retarder. Accordingly, this retarder is provided as the primary retarder in the drivetrain of the motor vehicle. Alternatively, the sustained-action braking device can also be in the form of a motor brake, which is located in the area of an internal combustion engine upstream from the transmission. Specifically, the motor brake can be in the form of an exhaust brake and/or a decompression brake.

The invention now embodies the technical principle that when the sustained-action braking device begins operating, a check is first carried out to determine the basis on which starting criterion was initiated for the operation of the sustained-action braking device. Depending on the starting criterion identified, then either a current workload of the sustained-action braking device is checked and compared with an associated threshold value, or a gearshift to a lowest possible gear of the motor vehicle transmission is carried out directly. In the case, when the current workload of the sustained-action braking device is compared with the associated threshold value, if the workload exceeds the threshold value the shifting strategy is adapted. In other words, in the method according to the invention, when a braking operation by the sustained-action braking device is detected it is first checked which starting criterion was originally used to initiate the said braking operation, i.e. by what means the operation of the sustained-action braking device has been started. Depending on which starting criterion is identified, either a first measure or a second measure is carried out. In the first measure a current workload of the sustained-action braking device is examined and compared with an associated threshold value, and if the threshold value is exceeded by the current workload the shifting strategy for the organization of gearshifts in the transmission is adapted. On the other hand, in the second measure a gearshift to that transmission gear is carried out in which the highest gear ratio of the transmission is produced.

Such a control method of gearshifts in a transmission has the advantage that a shifting strategy in the transmission can be adapted to suit various operating situations of a sustained-action braking device. This is because on the one hand, during the operation of the sustained-action braking device, by comparing a current workload of the sustained-action braking device with an associated threshold value it can be checked whether in relation to a suitable integration of the sustained-action braking device in the drivetrain an adaptation of the shifting strategy in the transmission is necessary. This adaptation is then carried out at the moment when it is recognized that the threshold value has been exceeded by the current workload of the sustained-action braking device. On the other hand, however, a direct gearshift in the transmission to the lowest possible gear and hence to a maximum transmission of a braking torque of the sustained-action braking device can be realized when a corresponding starting criterion for the operation of the sustained-action braking device has been recognized. Thus, as a function of the way in which the operation of the sustained-action braking device was initiated, an adaptation of the shifting strategy in the transmission is effected.

In the control of gearshifts in accordance with DE 102 42 567 A1, it is true that the operation of a sustained-action braking device is also taken into account, in that a current condition of the sustained-action braking device and/or an initial torque of the sustained-action braking device are involved in devising a shifting strategy. However, in this case it remains open how a specific adaptation of the shifting strategy to the operation of the sustained-action braking device is to be carried out.

In the context of the invention, the threshold value against which the current workload of the sustained-action braking device is compared as a function of the starting criterion identified is, in particular, a fixed, specified value. Nevertheless, different threshold values can be stored for different possible starting criteria. With which of the stored threshold values the current workload of the sustained-action braking device is then compared depends on the starting criterion for beginning the operation of the sustained-action braking device identified in each case.

In accordance with an embodiment of the invention, for adapting the shifting strategy, which is done if the threshold value has been exceeded, a reference parameter that refers to the current workload of the sustained-action braking device and a currently selected actuation step of the sustained-action braking device from a stored characteristic diagram are determined, and the reference parameter is then used for adapting the shifting strategy. Accordingly, in the context of this embodiment, if it is detected that the associated threshold value has been exceeded by the current workload, for adapting the shifting strategy a reference parameter is determined for which purpose a stored characteristic diagram is consulted. A characteristic diagram-based adaptation of the shifting strategy by way of the reference parameter, which depends on the current workload of the sustained-action braking device and the currently selected actuation level, enables simple and at the same time reliable adaptation of the shifting strategy.

As a further development of the above-mentioned embodiment, with the reference parameter and a current actuation level of a service brake of the motor vehicle, with reference to a further stored characteristic diagram, an adjusting parameter is determined, with reference to which shifting characteristic curves of the gearshift are formed. The additional involvement of a current actuation of a service brake of the motor vehicle makes it possible to determine a condition in which the shifting strategy in the transmission is to be changed having regard to the involvement of the sustained-action braking device and a current loading of the service brake. If, for example, it is in such a case determined that the current workload of the sustained-action braking device is low, as reflected by way of the reference parameter, but at the same time the current actuation level of the service brake is high, then by selectively changing the shifting strategy so as to increase the transmission of a braking torque of the sustained-action braking device, the load on the service brake can be reduced.

Specifically, the adaptation of the shifting strategy can take place if, with reference to the adjusting parameter, shifting characteristics are selected from various stored characteristic curves. Alternatively, or in addition, with reference to the adjusting parameter the shifting characteristics can be displaced. In this, particularly preferably the two measures described earlier are implemented together so that shifting characteristics are first selected from among various stored characteristic diagrams and these, if necessary, are displaced further. Advantageously, in that way the shifting strategy can be adapted to the operation of the sustained-action braking device in a simple manner. In that case the adaptation is in particular carried out in such manner that as the adjusting parameter increases, higher downshift rotation speeds are obtained for the gearshift.

According to a possible design of the invention, as a starting criterion it is checked whether the actuation of the sustained-action braking device was started at the request of a vehicle driver. If so, i.e. if the reason for actuating the sustained-action braking device is a corresponding request by the vehicle driver, then in addition an actuation level of the sustained-action braking device selected by the vehicle driver is checked, and if it is found that the vehicle driver has selected the highest actuation level the gearshift is carried out to the lowest possible gear of the transmission, whereas otherwise the comparison of the current workload of the sustained-action braking device against the associated threshold value is carried out. This has the advantage that thereby, an adaption of the shifting strategy is carried out as a function of a braking performance desired by the vehicle driver and to be realized by means of the sustained-action braking device. If the vehicle driver calls for the highest actuation level of the sustained-action braking device and thereby signals that he wants the sharpest possible braking by the sustained-action braking device, then without comparing the current workload with the associated threshold value a shift is carried out to the lowest possible gear of the transmission in order, by virtue of the choice of the highest possible gear ratio of the transmission, to achieve the highest possible transmission of the braking torque of the sustained-action braking device. In contrast, if the vehicle driver selects an actuation level lower than the highest level, then by virtue of the comparison of the workload of the sustained-action braking device with the associated threshold value the adaptation of the shifting strategy described earlier is carried out if the threshold value has been exceeded. In that way various requirements and wishes of the vehicle driver can be taken into account.

In a further advantageous embodiment of the invention, as a starting criterion it is checked whether the actuation of the sustained-action braking device was initiated due to a demand by a driver-assistance system, and if so the comparison of the current workload of the sustained-action braking device with the associated threshold value is carried out. Thus, in the context of the method according to the invention the shifting strategy can also be adapted if the actuation of the sustained-action braking device has been initiated not by the vehicle driver, but by a driver-assistance system. The driver-assistance system can in this case be an adaptive speed control (ACC), an adaptive speed limiting system (ASL) or a speed restriction system. Particularly preferably, the starting criterion for an actuation of the sustained-action braking device by a driver-assistance system is checked together with the starting criterion described earlier, namely actuation by the vehicle driver, in order to satisfy the various possible initiation criteria for the operation of the sustained-action braking device. Particularly preferably, when it is detected that the operation of the sustained-action braking device has been initiated by a driver-assistance system, this is followed by a comparison against a threshold value other than that used when the initiation is carried out by the driver. Furthermore, when the threshold value has been exceeded and during the course of the further adaptation of the shifting strategy, a currently selected actuation level of the sustained-action braking device is set to zero and thereby a determination in the associated characteristic diagram is carried out.

Ina further development of the invention, if the comparison of the current workload of the sustained-action braking device against the associated threshold value shows that the said workload is below the said threshold value, then the shifting strategy is not adapted. Correspondingly, gearshifts are carried out in the transmission in accordance with the shifting strategy otherwise existing.

An object of the invention is, furthermore, a control unit which is preferably a transmission control unit of the transmission. The control unit is in this case designed to take into account an operation of a sustained-action braking device when devising a shifting strategy for gearshifts in the transmission, and during this when the operation of the sustained-action braking device begins, to check with which starting criterion the operation of the sustained-action braking device was initiated. For that, as a function of the starting criterion identified the control unit either checks a current workload of the sustained-action braking device and compares it against an associated threshold value, or alternatively, depending on the staring criterion identified, initiates a gearshift to the lowest possible gear of the transmission. In addition, the control unit is designed to adapt the shifting strategy if the comparison of the current workload against the associated threshold value shows that the threshold value has been exceeded. Advantageously, in that way the method according to the invention can be realized in the area of a drivetrain since the control unit carries out the necessary steps. Particularly preferably, moreover, the control unit is also designed to carry out the further variants of the method described earlier.

The method according to the invention can also be incorporated as a computer program product which, when it is run on a processor such as the processor of a control unit as described above, instructs the processor by software means to carry out the steps of the method which is the object of the invention. In this connection a computer-readable medium is also part of the object of the invention, upon which medium the aforesaid computer program product is stored and from which it can be called up again.

The invention is not limited to the indicated combination of features in the independent claims or the claims that depend on them. There are also possibilities for combining individual features with one another, provided that they emerge from the claims, the following description of a preferred embodiment of the invention or directly from the drawings. References in the claims to the drawings by the use of indexes are not intended to restrict the protective scope of the claims.

BRIEF DESCRIPTION OF THE DRAWINGS

An advantageous embodiment of the invention, which is explained below, is illustrated in the drawings, which show.

DETAILED DESCRIPTION

Figure 1:
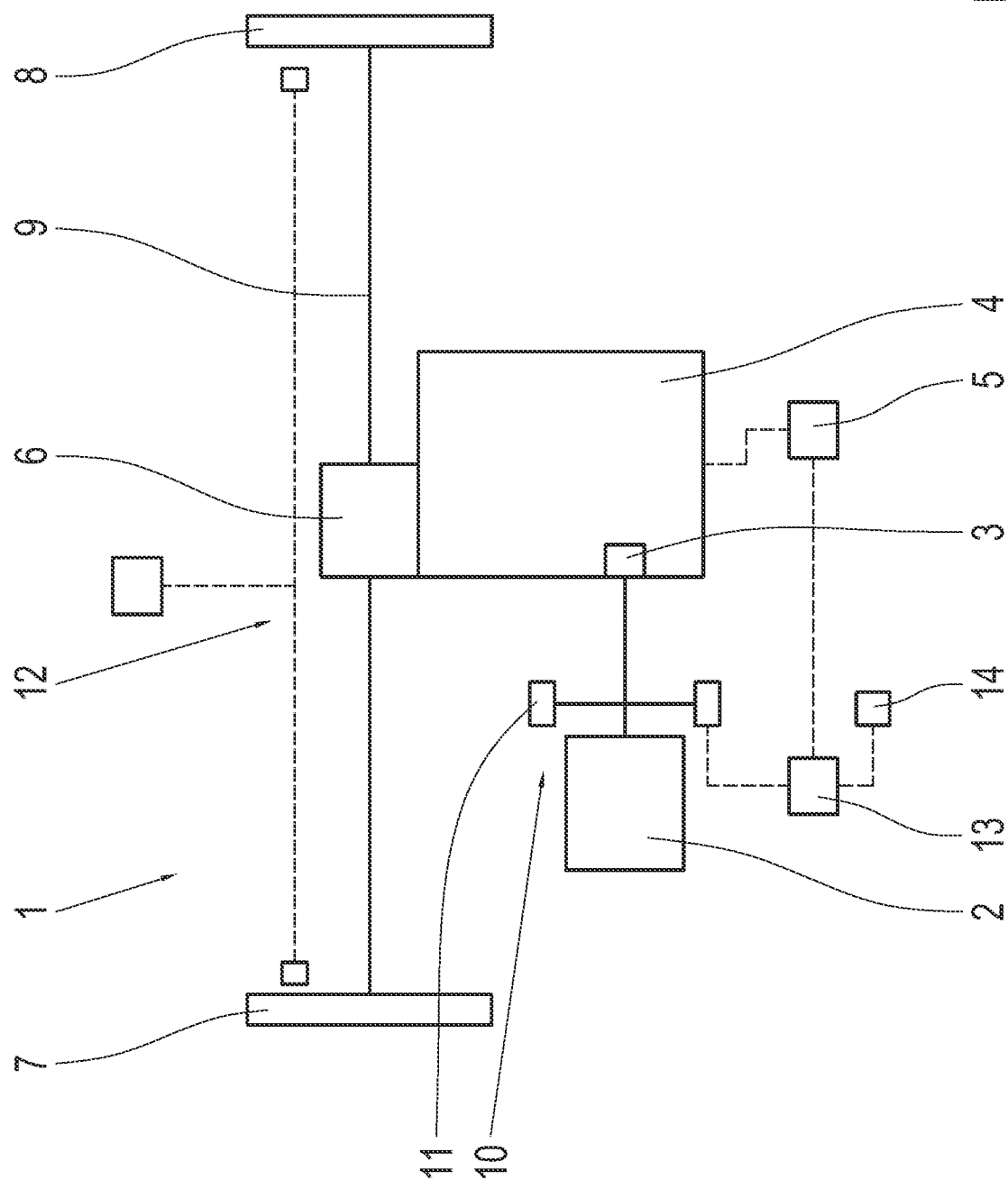
FIG. 1: A schematic representation of a motor vehicle drivetrain.

FIG. 1 shows a schematic representation of a motor vehicle drivetrain 1, this being in particular the drivetrain of a utility vehicle such as a truck. The motor vehicle drivetrain 1 comprises a drive machine 2 which is in the form of an internal combustion engine and is connected on its drive output side, via an intermediate torsion fluctuation damper 3, to a transmission input of a downstream transmission 4. The torsion fluctuation damper 3, and if necessary a starter element provided on the input side of the transmission 4, are in this case integrated in a housing of the transmission 4.

In the present case the transmission 4 is in the form of an automated manual transmission or an automatic transmission, in which gearshifts are carried out automatically. For that purpose, a control unit is associated with the transmission 4, which controls gearshifts in the transmission 4. On its drive output side, the transmission 4 is connected to an axle differential 6, by way of which drive power of the drive machine 2 geared by the transmission 4 is distributed to drive wheels 7 and 8 of a drive axle 9 of the motor vehicle.

In the motor vehicle drivetrain 1, connected between the drive machine 2 and the transmission 4, there is also a sustained-action braking device 10 in the form of a retarder 11, which is preferably in the form of a hydrodynamic retarder and is connected in a rotationally fixed manner to the drive output side of the drive machine 2. Within the motor vehicle drivetrain 1 the retarder 11 serves during a braking operation to supply a braking torque in order to assist a service brake 12 by means of which the drive wheels 7 and 8, and also further wheels of the motor vehicle—no more of which are shown in this case—can be braked. In the retarder 11 various actuation levels and consequently various braking torques can be produced, which are transmitted via the downstream transmission 4 to the drive wheels 7 and 8 of the drive axle 9. The particular actuation level is in this case set by a control unit 13 of the retarder 11, which selects the actuation level concerned either in accordance with a choice made by a vehicle driver using an input element 14, or in accordance with a specification by a driver-assistance system. The driver-assistance system can in this case be an adaptive speed control (ACC) or an adaptive speed limitation system (ASL), or even a speed limitation system.

Figure 2:
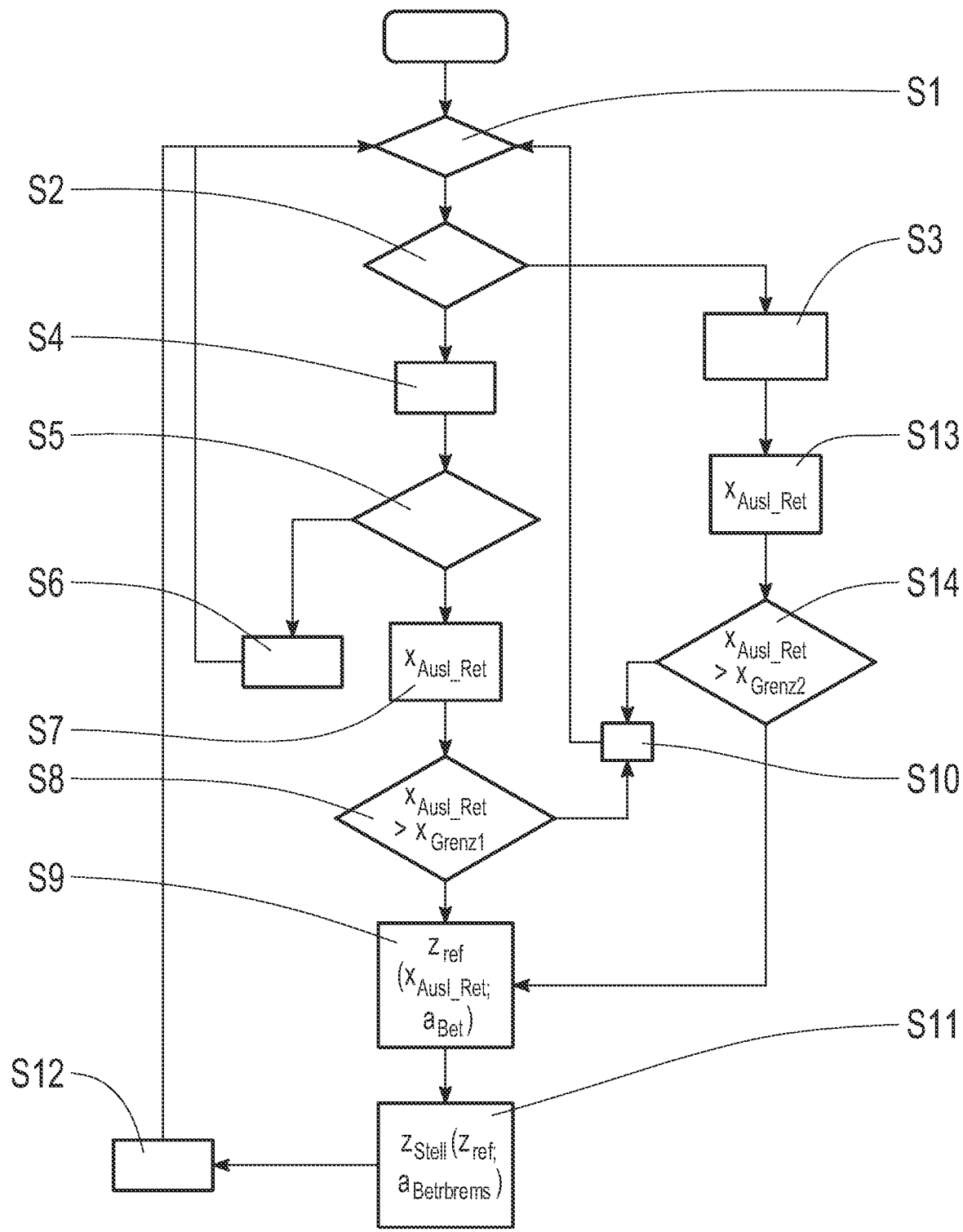
FIG. 2: A flow chart of a method according to the invention for controlling gearshifts in a transmission of the motor vehicle drivetrain shown in FIG. 1.

During the course of a braking operation by the retarder 11, the control unit 5 of the transmission 4 checks whether a shifting strategy for the organization of gearshifts in the transmission 4 should be adapted in order to achieve an optimum integration of the retarder 11. This checking procedure is carried out in accordance with a method according to the invention, whose flow chart is shown in FIG. 2.

At the beginning of the method according to the invention, in a first step S1 it is first examined whether an operation of the retarder 11 has been initiated and is still active. If not, then the method is terminated, whereas otherwise the system progresses to a step S2 in which it is examined whether, as the starting criterion for the operation of the retarder 11, there was a request by the driver of the vehicle. If not, then a change to a step S3 takes place in which, as the starting criterion for the operation of the retarder 11, a specification by a driver-assistance system is recognized.

On the other hand if in step S2 it is found that the retarder 11 is operating because of a command by the vehicle driver, then in a step S4, after the lapse of a specified time it is examined which actuation level of the retarder 11 has been chosen by the vehicle driver by way of the input element 14. In a subsequent step S5 it is then checked whether the actuation level is the highest actuation level, and if so the system advances to a step S6, whereas otherwise step S5 is followed by a step S7.

In step S6 the control unit 5 initiates a downshift in the transmission 4 to the lowest gear, i.e. the gear with the highest transmission ratio. Then the system springs back to step S1 so that it is checked again whether the retarder 11 is still operating and thereafter whether the driver of the vehicle might perhaps have changed his choice of the actuation level.

In contrast, in step S7 a current workload $x_{Ausl\_Ret}$ of the retarder 11 is checked, such that in particular a percentage workload of the retarder 11 relative to a maximum obtainable braking power is determined. In a step S8 the current workload determined is compared against a threshold value $x_{Grenz1}$ which is permanently stored. If the current workload $x_{Ausl\_Ret}$ of the retarder 11 is found in step S8 to exceed the said threshold value $x_{Grenz1}$ then the system changes to a step S9, whereas otherwise, in a step S10 the current shifting strategy in the transmission 4 is maintained and the system then reverts to step S1.

In step S9, with reference to the current workload $x_{Ausl\_Ret}$ of the retarder 11 and the selected actuation level $a_{Bet}$, a reference parameter $z_{ref}$ from a characteristic diagram is determined and the system then changes to a step S1 in which, in a further characteristic diagram and with reference to the reference parameter $z_{ref}$ from step S9 and a current actuation level $a_{Betrbrems}$ of the service brake 12, an adjustment parameter $z_{Stell}$ is determined. For this purpose, the current actuation level $a_{Betrbrems}$ of the service brake 12 is determined in advance. After that, with reference to the adjustment parameter $z_{Stell}$ and in a step S12 the shifting strategy in the transmission 4 is implemented by the control unit 5, in that with reference to the adjustment parameter $z_{Stell}$ the control unit 5 makes a selection from various stored characteristic curves and if necessary also displaces the shifting characteristics. In this case the shifting characteristics are chosen and if necessary their displacement is calculated in such manner that with increasing adjustment parameter $z_{Stell}$ higher downshift rotation speeds are obtained in the transmission 4. After step S12 the system springs back to step S1 and thereby a new check is carried out to see whether the retarder 11 is still operating and whether its operation might have changed.

In contrast, if the system has changes from step S2 to step S3 in which it has been found that as the starting criterion a command to operate the retarder 11 was issued by a driver-assistance system, then a change to a step S13 takes place in which a current workload $x_{Ausl\_Ret}$ of the retarder 11 is determined, as was also done in step S7. With this current workload $x_{Ausl\_Ret}$ of the retarder 11, in a step S14 a comparison with a threshold value $x_{Grenz2}$ is carried out, wherein $x_{Grenz2}$ is different from the threshold value $x_{Grenz1}$ is step S8. If in step S14 the current workload $x_{Ausl\_Ret}$ of the retarder 11 is found to be lower then the associated threshold value $x_{Grenz2}$, then the system changes to step S10, whereas if the current workload $x_{Ausl\_Ret}$ of the retarder 11 is found to be higher then the associated threshold value $x_{Grenz2}$, then the system changes to step S9. In this case, however, for the determination of the reference parameter $z_{ref}$ from the characteristic diagram the currently chosen actuation level $a_{Bet}$ of the retarder 11 is set to zero. After step S9 or step S10, the process continues as described earlier.

By means of the procedure according to the invention the organization of gearshifts in the transmission can be adapted to the operation of a sustained-action braking device in an optimum manner.

INDEXES

1 Motor vehicle drivetrain
2 Drive machine
3 Torsion fluctuation damper
4 Transmission
Control unit
6 Axle differential
7 Drive wheel
8 Drive wheel
9 Drive axle
Sustained-action braking device
11 Retarder
12 Service brake
13 Control unit
14 Input element
$x_{Ausl\_Ret}$ Workload
$x_{Grenz1}$ Threshold value
$x_{Grenz2}$ Threshold value
$a_{Bet}$ Actuation level
$z_{ref}$ Reference parameter
$z_{Stell}$ Adjustment parameter
$a_{Betrbrems}$ Actuation level of the service brake
S1 to S14 Individual steps

The invention claimed is:

1. A method for controlling gearshifts in a transmission of a motor vehicle drivetrain, wherein a shifting strategy is based at least in part on operation of a sustained-action braking device, the method comprising:
   initiating actuation of the sustained-action braking device;
   determining, after initiating use of the sustained-action braking device, a starting criterion for initiating actuation of the sustained-action braking device; and
   executing, based on the starting criterion, an operation selected from (i) comparing a current workload of the sustained-action braking device with an associated threshold value, and (ii) shifting a gear directly to a lowest possible gear of the motor vehicle transmission.

2. The method according to claim 1, further comprising:
   determining that the current workload of the sustained-action braking device exceeds the threshold value; and
   modifying the shifting strategy.

3. The method according to claim 2, wherein modifying the shifting strategy comprises:
   determining a reference parameter based on the current workload of the sustained-action braking device;
   selecting an actuation level of the sustained-action braking device from stored characteristics; and
   modifying the shifting strategy based on the reference parameter.

4. The method according to claim 3, comprising determining an adjustment parameter based on the reference parameter and based on a current actuation level of a service brake of the motor vehicle.

5. The method according to claim 4, wherein the adjustment parameter is further based in part on an additional stored characteristic and based in part on a previously selected shifting characteristic of the gearshift.

6. The method according to claim 5 comprising selecting, based on the adjustment parameter, a further shifting characteristic from the stored characteristics.

7. The method according to claim 6, comprising displacing the further shifting characteristic based on the adjustment parameter.

8. The method according to claim 3, wherein modifying the shifting strategy comprises decreasing an actuation level of a service brake and increasing the actuation level of the sustained-action braking device.

9. The method according to claim 3, wherein modifying the shifting strategy comprises increasing a current actuation level of a service brake of the motor vehicle and decreasing the current workload of the sustained-action braking device.

10. The method according to claim 3, wherein modifying the shifting strategy comprises increasing a downshift rotation speed.

11. The method according to claim 1, wherein determining the starting criterion comprises:
determining that actuation of the sustained-action braking device was initiated by an action of a vehicle driver;
determining that an actuation level of the sustained-action braking device is a highest actuation level; and
shifting into the lowest possible gear of the transmission.

12. The method according to claim 1, wherein determining the starting criterion comprises:
determining that actuation of the sustained-action braking device was initiated by a driver-assistance system; and
comparing the current workload of the sustained-action braking device with the associated threshold value.

13. The method according to claim 12, wherein the driver-assistance system is one of an adaptive speed control, an adaptive speed limiting system, and a speed restriction system.

14. A computer program product containing executable code that, when executed by a transmission control unit for a motor vehicle, executes the method of claim 1.

15. A transmission control unit configured to take into account operation of a sustained-action braking device when devising a shifting strategy for gearshifts in a transmission of a motor vehicle, the control unit configured to:
(i) initiate actuation of the sustained-action braking device;
(ii) determine, after initiating actuation of the sustained-action braking device, a starting criterion for initiating actuation of the sustained-action braking device;
(iii) execute, based on the starting criterion, an operation selected from (i) comparing a current workload of the sustained-action braking device with an associated threshold value, and (ii) shifting a gear directly to a lowest possible gear of the motor vehicle transmission; and
(iv) adapt the shifting strategy if the current workload of the sustained-action braking device exceeds the threshold value.

16. The transmission control unit according to claim 15, further configured to
determine a reference parameter based on the current workload of the sustained-action braking device;
select an actuation level of the sustained-action braking device from stored characteristics; and
adapt the shifting strategy based on the reference parameter.

17. The transmission control unit according to claim 16, further configured to determine an adjustment parameter based on the reference parameter and based on a current actuation level of a service brake of the motor vehicle.

18. The transmission control unit according to claim 17, further configured to displace a shifting characteristic based on the adjustment parameter.

19. The transmission control unit according to claim 17, further configured to change a ratio of an actuation level of the service brake and the actuation level of the sustained-action braking device.

20. The transmission control unit according to claim 19, further configured to increase a downshift rotation speed.

* * * * *